United States Patent [19]

Fernquist et al.

[11] 4,155,341

[45] May 22, 1979

[54] IGNITION SYSTEM

[75] Inventors: James F. Fernquist, Farmington; James C. Byrne, Farmington Hills, both of Mich.

[73] Assignee: Gulf & Western Manufacturing Company, Southfield, Mich.

[21] Appl. No.: 781,745

[22] Filed: Mar. 28, 1977

[51] Int. Cl.² ............................................. F02P 3/06
[52] U.S. Cl. ........................... 123/148 CC; 123/148 E
[58] Field of Search ...... 123/148 CC, 148 E, 146.5 A

[56] References Cited

U.S. PATENT DOCUMENTS

| | | | |
|---|---|---|---|
| 3,241,538 | 3/1966 | Hogenholtz | 123/148 E |
| 3,297,009 | 1/1967 | Sasaki et al. | 123/148 E |
| 3,675,636 | 7/1972 | Hini | 123/148 E |
| 3,738,339 | 6/1973 | Huntzinger et al. | 128/148 E |
| 3,809,040 | 5/1974 | Burson et al. | 123/148 CC |
| 3,867,916 | 2/1975 | Bigalke | 123/146.5 A |
| 3,875,920 | 4/1975 | Williams | 123/148 E |
| 4,008,701 | 2/1977 | Webber | 123/148 E |

Primary Examiner—Verlin R. Pendegrass
Assistant Examiner—S. A. Cangialosi
Attorney, Agent, or Firm—Meyer, Tilberry & Body

[57] ABSTRACT

An improved ignition system including a member rotatable about an axis and having a permanent magnet with an outwardly extending flux field carried by the member to create a flux field rotating in a given angular path concentric with the axis of the rotating member. In the system there is provided a circuit for creating a sparking voltage upon a rapid change in current in at least a portion of the circuit and switching means for causing the rapid change in current upon actuation of the switching means. The improvement includes a device for storing sparking energy, the switching means includes a solid state device for discharging the storage device upon receipt of a firing signal and a Hall Effect switch activated by a selected D.C. biasing voltage and mounted at a given position with respect to the annular path of the rotating flux field. The Hall Effect switch initiates the switching means to discharge the storage device and cause sparking of the ignition system. Also, there is provided means for limiting the rate of storage of the storage device for limiting maximum speed of an internal combustion engine controlled by the improved ignition system.

38 Claims, 9 Drawing Figures

IGNITION SYSTEM

This invention relates to the art of ignition systems for internal combustion engines and more particularly to an improved ignition system of the type having switching means for discharging stored electrical energy to create sparking voltage.

BACKGROUND OF INVENTION

The present invention is particularly applicable for a single cylinder internal combustion engine used in a movable implement such as a power saw and it will be described with particular reference thereto; however, the invention has much broader applications and may be used in various internal combustion engines for a variety of purposes having a various number of control spark plugs.

In the past, the ignition system for hand implements, such as power saws, lawn mowers, snow blowers and the like, have used a magneto system wherein a rotating flywheel carries a permanent magnet which induces a voltage in the primary winding of an ignition coil. Mechanical points then open the primary winding circuit at a selected time when the induced voltage has caused a high or peak current flow. This collapses the current flow in the primary winding and causes a high voltage in the secondary winding of the ignition coil. Some prior ignition systems for small engines have used the capacitor or induction discharge concept. In the capacitor concept, a capacitor is charged to a given voltage and stores electrical energy. Mechanical points are then actuated to discharge the stored energy in the primary winding of an ignition coil. In this manner, a high sparking voltage is created in the secondary winding of the ignition coil to cause a spark at the spark plug. These types of systems have been employed in various implements driven by single cylinder internal combustion engines. These ignition systems have also been used in larger engines having more than one cylinder. In each of these instances, mechanical switching is required for creating the sparking voltage at the spark plug. Substantial effort has been made to completely eliminate mechanical switching in ignition systems, primarily for multiple cylinder internal combustion engines such as those used in motor vehicles. These systems have used a variety of solid state switching arrangements for creating a rapid change in current to induce a high voltage at the secondary winding of the ignition coil. In many of these systems, an inductive trigger is used to discharge the electrical energy. Such a trigger is operated by a moving magnetic field driven by the engine. Consequently, the speed of the engine determines the firing point which may not be the desired position for a discharge system.

The present invention relates to an improvement in the solid state ignition arrangement for a discharge system and primarily to an improvement in such a system which is beneficially used in a single cylinder engine although applicable to other types of ignition systems. The invention uses no mechanical switching for the energy discharge circuit and is operated independently of engine speed, although it may be coordinated with engine speed.

THE INVENTION

In accordance with the present invention, there is provided an improvement in an ignition system including a member rotatable about an axis, a permanent magnet having an outwardly extending flux field and carried by the member to create a flux field rotating in a given annular path concentric with the axis, a circuit for creating a sparking voltage in a first winding upon a rapid changing current in at least a portion of the circuit, and switch means for causing the rapid change in current upon actuation thereof. This improvement includes an electrical energy storing means in the circuit for storing electrical energy, a Hall Effect switch means for periodically discharging, upon actuation, said stored energy through a second winding magnetically coupled to the first winding, a biasing circuit for directing a D.C. biasing voltage of a selected level to the Hall Effect switch, and means for locating the Hall Effect switch at a selected position in the path.

In accordance with another aspect of the invention, the improvement as defined above, includes a coil means for directing electrical energy to the storing means and means for mounting the coil means in the path to receive induced energy upon exposure to the moving magnetic field. In this manner, the storage means and the Hall Effect switch means are both operated by the same moving magnetic field.

In accordance with another aspect of the invention, there is provided a circuit means for storing energy in the storing means at a selected rate, which selected rate is sufficient to store electrical energy to a given sparking level when the time spacing of the periodic discharging operations of the Hall Effect switch is above a selected amount. In this manner, if the time spacing between adjacent discharge operations by the Hall Effect switch is below a given level, a sparking voltage is not available in the ignition system. This provides an efficient over speed control for the internal combustion engine using the improved ignition system.

In accordance with another aspect of the invention, the selected rate of storing energy in the storage means is varied. In this manner, the maximum speed of the internal combustion engine controlled by the improved ignition system is selectively variable.

In accordance with still a further aspect of the invention, the D.C. biasing circuit includes a coil means in the annular path of the moving magnetic flux field. In this manner, voltage is induced into the coil by the same flux field which controls the charging of the capacitor or other storage device and the operation of the Hall Effect switch. This provides an efficient manner for performing the total ignition function.

In accordance with another aspect of the invention, there is provided an improvement as defined above, which improvement includes means for changing the angular speed of the rotatable member over a given range and mechanical means for changing the selected location of the Hall Effect switch in the flux path in accordance with the speed change and for at least a portion of the speed range.

The primary object of the present invention is the provision of an improved ignition system, which improvement can be used in various internal combustion engines and is durable and requires less maintenance than systems employing mechanical switching.

Still another object of the present invention is the provision of an improved ignition system, which improvement includes an energy storing means discharged periodically by a Hall Effect switch.

Yet another object of the present invention is the provision of an improvement as defined above, which improvement provides an ignition system having no mechanical switching and thus reduces wear caused by such switching.

Another object of the present invention is the provision of an improvement as defined above, which improvement allows for an over speed limitation in an internal combustion engine without requiring moving parts.

Still a further object of the present invention is the provision of an improvement as defined above, which improvement allows for over speed limitation in an internal combustion engine without flooding the carburetor and effecting ease of subsequent starting.

Another object of the present invention is the provision of an improvement as defined above, which improvement provides a firing position that is not determined by a mechanical switch and is independent of engine speed.

These and other objects and advantages will become apparent from the following description.

BRIEF DESCRIPTION OF DRAWINGS

In the description, the accompanying drawings are used.

PREFERRED EMBODIMENT

Figure 1:
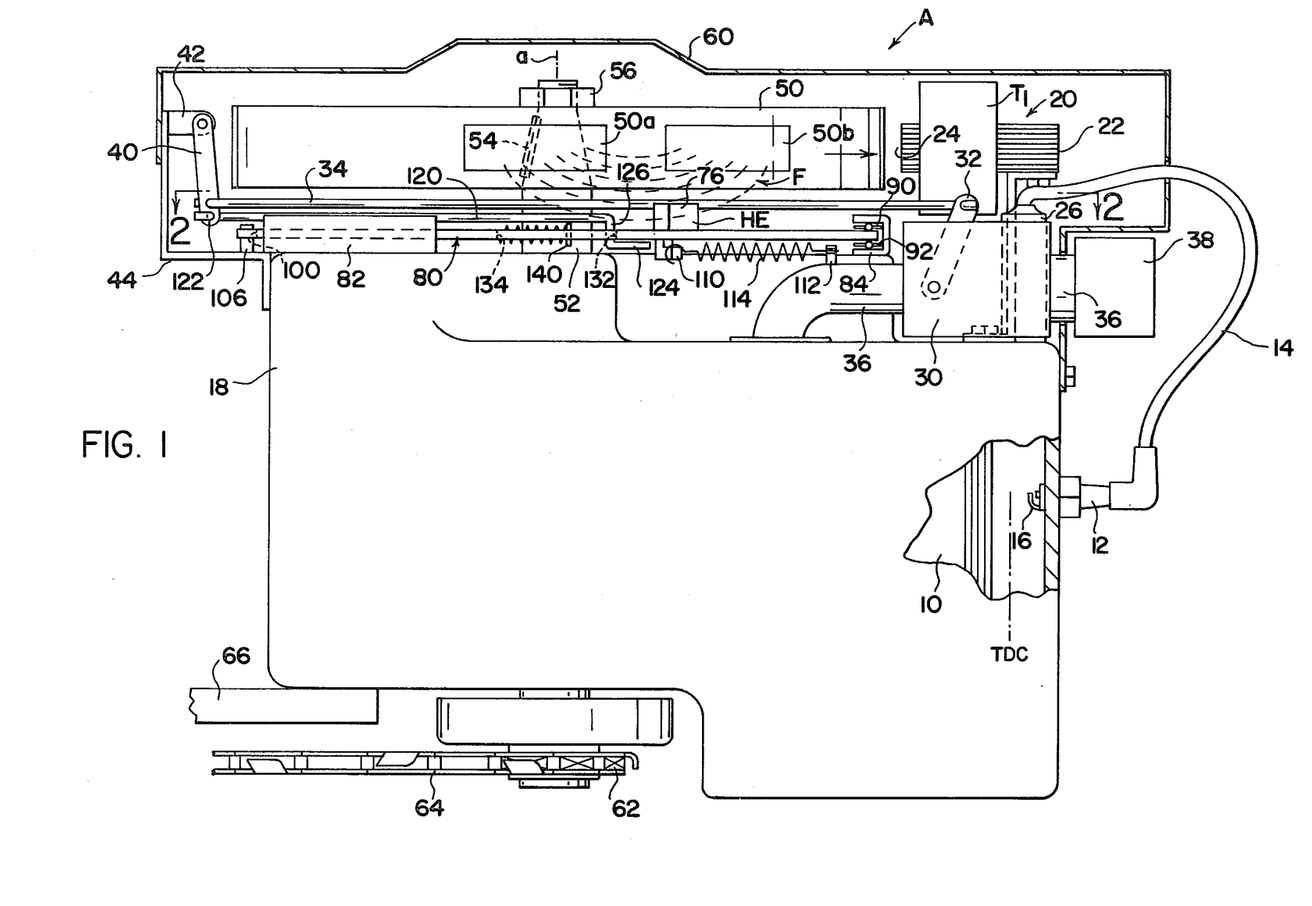
FIG. 1 is a schematic side elevational view illustrating the environment of the preferred embodiment of the present intion and certain components of the invention.
Figure 2:
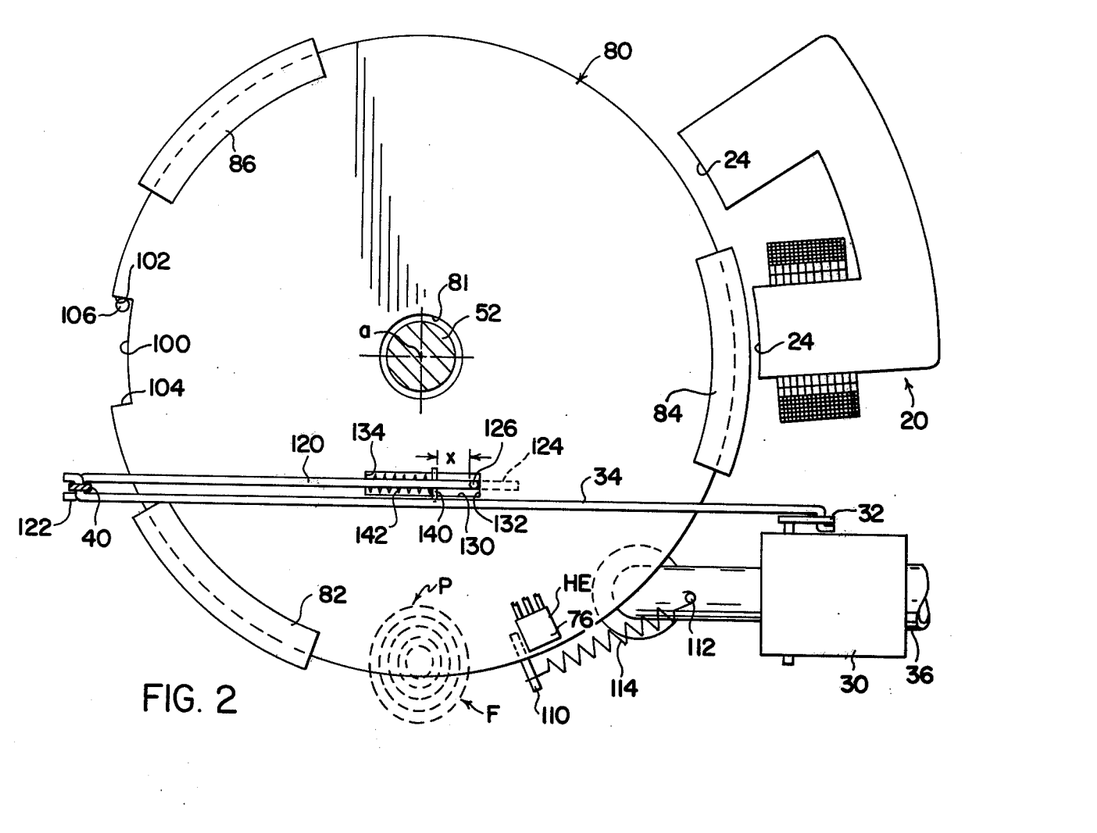
FIG. 2 is a partial top elevational view taken generally along line 2—2 of FIG. 1.

Referring now to the drawings, wherein the showings are for the purpose of illustrating a preferred embodiment of the invention only, and not for the purpose of limiting same, FIGS. 1 and 2 illustrate an appliance A, in the form of a chain saw of the type driven by an internal combustion engine having a single cylinder. Of course, the invention is applicable to other types of internal combustion engines having different number of cylinders, as long as a spark plug is required for igniting the combustible mixture within the cylinder. An internal combustion engine is schematically illustrated as including piston 10 and spark plug 12 connected to the ignition system by a wire 14. The spark plug includes two spaced electrodes, one of which is shown as electrode 16. The internal combustion engine is located within housing 18, which forms the support body of appliance A. The ignition system for creating a spark across electrode 16 includes coil means 20 having core 22 with inwardly facing pole shoes 24 which are within the path P of rotating magnetic flux field F. Of course, other arrangements could be used for inducing a voltage in the coil means 20 which includes a winding $T_1$ wrapped around core 22 for receiving induced charging voltage as will be explained later. A somewhat standard ignition coil 26, shown in FIG. 1 and schematically illustrated in FIGS. 4–6, includes primary winding $T_2$, secondary winding $T_3$ and magnetic coupling core 28 of high permeability material, such as soft iron laminations. This standard ignition coil structure is used for creating a sparking voltage across electrodes 16 of spark plug 12 by wire 14 extending from the secondary $T_3$. A carburetor 30 of somewhat standard design is controlled by a manually movable link 32 through a connecting rod 34. This carburetor controls an intake system illustrated schematically in FIG. 1 as including an air filter 38, in accordance with standard practice. Accelerator link 40 is controlled by an appropriately positioned manually movable trigger to control the setting of carburetor 30 and thus the requested speed of the internal combustion engine used in appliance A. In the illustrated embodiment, arm 42 is fixedly secured onto outboard bracket 44. Thus, as an operator depresses the accelerator trigger, link 40 controls carburetor link 32 to increase the intake through carburetor 30.

To create the rotating magnetic flux field F travelling in an annular path P, there is provided a flywheel 50 having the basic structure of a magneto flywheel of the type used in a magneto ignition system. Flywheel 50 thus includes a permanent magnet with outwardly facing circumferentially extending magnetic poles 50a, 50b properly polarized to produce the desired induced voltage within coil means 20 for a purpose to be hereinafter described. Flux field F intersects pole shoes 24 of core 22 for inducing a voltage in the winding $T_1$ for use in the ignition system constructed in accordance with a preferred embodiment of the invention. Flywheel 50 is connected to a shaft 52 and is rotatable about an axis a. An appropriate arrangement is used for securing flywheel 50 for rotation with shaft 52. A variety of structures could be used; however, in accordance with the illustrated embodiment, key 54 holds tapered bore of flywheel 50 over the tapered end of shaft 52. Nut 56 prevents axial movement of the flywheel during operation of appliance A. The illustrated appliance includes cover 60 for enclosing the flywheel and ignition system of the illustrated embodiment. In accordance with this illustrated embodiment, sprocket 62 drives chain 64 supported by chain guide 66 in accordance with standard practice in the construction of a chain saw. Of course, the environment of the present invention is not important and is used for illustrative purposes only.

Figure 3:
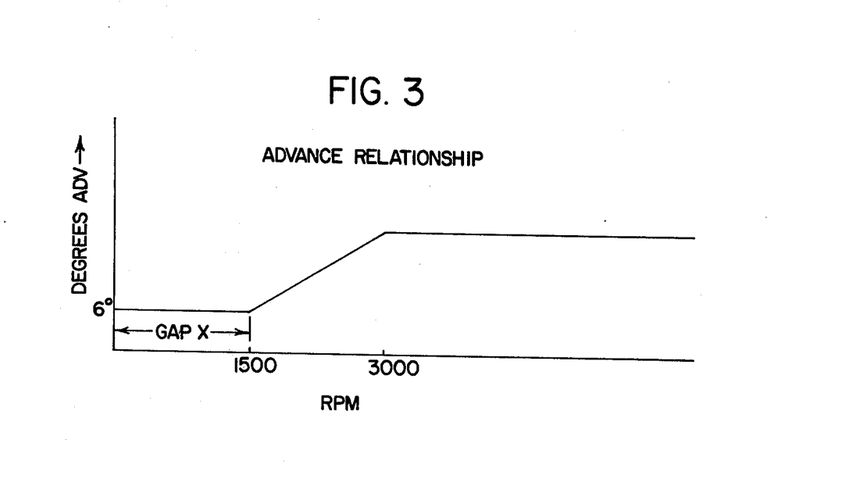
FIG. 3 is a velocity graph illustrating a characteristic of the preferred embodiment of the invention.

Below flywheel 50 there is provided a Hall Effect switch HE having an output 70, biasing or power supply terminals 72, 74 and an upper flat surface 76. This switch causes the discharge spark when exposed to flux field F as will be explained in more detail with respect to the circuits of FIGS. 4–6. In accordance with one aspect of the invention, the position of switch HE is changed as the engine speed is changed. Various structures could be used for this purpose. In the illustrated embodiment, a manually movable plate 80 is rotatable about axis a. An opening 81 of plate 80 surrounds shaft 52 for movement of plate 80 angularly with respect to the shaft. An appropriate arrangement is used for allowing selected manual movement of plate 80. Various mechanisms could be employed; however, in accordance with the illustrated embodiment, circumferentially spaced bearing stands 82, 84 and 86 locate and rotatably mount plate 80. These stands are illustrated as generally arcuately contoured, U-shaped channels with upper and lower ball bearing plates 90, 92 in each of the channels. In this manner, plate 80 is rotatable about axis a. As best shown in FIG. 2, slot 100 having ends 102, 104 coacts with a pin 106 supported on bracket 44 to limit the arcuate, or angular, movement of plate 80 with respect to axis a of the rotating magnetic field and flywheel 50. Lug 110 on plate 80 and a fixed pin 112 are connected by a tension, coil spring 114. This structure spring biases plate 80 into the position illustrated in FIG. 2. In this initial position of plate 80, pin 106 engages edge 102 of slot 100. Plate 80 is used as a mechanical means for manually moving Hall Effect switch HE having output 70 and biasing or power supply terminals 72, 74. The upper flat surface of switch HE carries the Hall cell or chip and when this surface is exposed to a magnetic field, an output signal is created in the output 70. As will be explained in connection with FIGS. 4-6, the Hall Effect switch, when exposed to the magnetic field F, causes firing of a spark across electrode 16 of spark plug 12. The angular position of Hall Effect switch HE determines the firing position with respect to the angular rotation of flywheel 50 and thus the angular position of the crankshaft of the internal combustion engine. Thus, the position of the Hall Effect switch in path P of flux field F determines the relationship of the spark created at spark plug 12 and the cycle of the internal combustion engine. By allowing mechanical movement of the Hall Effect switch within path P of flux field F, the advance and retard position of the created spark can be manually adjusted. Various mechanisms could be employed for this purpose; however, in the illustrated embodiment, plate 80 is rotated to change the firing position of the spark at spark plug 12. In accordance with one aspect of the invention, this manual movement of the Hall Effect switch is coordinated with the speed of the internal combustion engine. The faster the speed of the engine, the more the spark is advanced by moving Hall Effect switch HE to the left as shown in FIG. 2. To provide the desired coordination between the speed of the engine and the advance of the spark, there is provided an interconnecting mechanism, schematically illustrated as a spark advance rod 120 having a first end 122 pivotally secured to accelerator link 40. The second end 124 of rod 120 is provided with a vertical segment 126 extending through an opening 130 in plate 80. This opening has a first edge 132 initially engageable by segment 126 and a second edge 134. As illustrated, a slidably mounted bias plate 140 is movable to the left, as shown in FIG. 2, against the biasing effect of a compression spring 142. The distance x is the maximum spacing between plate 140 and segment 126 when the accelerator is at the lowest value. Thus, as rod 120 is moved to the left, during acceleration of the internal combustion engine, vertical segment 126 leaves edge 132. Plate 80 is not moved until vertical segment 126 engages plate 140. At that time, the spring 142, which has a higher spring constant than spring 114, holds plate 140 in the position illustrated in FIG. 2. Thus, the action of vertical segment 126 against plate 140 elongates spring 114 to move plate 80 with pin 106 leaving edge 102. As the position of the accelerator continues to increase the speed of the internal combustion engine, vertical segment 126 continues to rotate plate 80. This advances the position of Hall Effect switch HE until edge 104 of slot 100 engages pin 106. At that time, plate 80 can move no further in an angular direction. Consequently, further movement of lever 40 in the clockwise position, as shown in FIG. 1, causes segment 126 and plate 140 to compress spring 142. This continued movement of lever 40 causes no further movement of plate 80. The spark maximum advance is determined by the relative position of Hall Effect switch HE with respect to the rotating flywheel 50 when edge 104 is against pin 106. Consequently, during acceleration of the internal combustion engine, the firing point remains constant for a length of movement determined by the distance x between vertical segment 126 and plate 140. After this movement has been accomplished by link 40, further increase in speed of the internal combustion engine increases the advance of the spark. After this changeable advance has progressed with further increases in speed to the extent determined by the arcuate length of slot 100, further spark advance does not occur with the increased engine speed. This relationship is schematically illustrated in FIG. 3. Of course, the advance of the spark by changing the selected position by the Hall Effect switch HE can be controlled by the location and arcuate length of slot 100 together with spacing x, as shown in FIG. 2. As the speed of the internal combustion engine is decreased, the reverse action generally takes place and the spark is retarded as speed is decreased. The relationship depicted in FIG. 3 is illustrative in nature and may be varied in accordance with the particular design of the internal combustion engine at the desired relationship of the spark with respect to the top dead center of the piston 10 as it is operating in the internal combustion engine. Flux field F between poles 50a, 50b extends radially outwardly and also radially upwardly and downwardly from flywheel 50. Thus, the Hall Effect switch HE on plate 80 and below magnet poles 50a, 50b is within the path P of flux field F. Of course, the Hall Effect switch could be located in a position spaced radially from the periphery of the flywheel by providing a bracket on plate 80. However, in practice, the Hall Effect switch is located in path P of flux field F and below the peripheral edge of flywheel 50.

As is well known, a Hall Effect switch is an integrated circuit component utilizing the Hall Effect principle to change the voltage at output 70. The Hall Effect switch is biased by a 5–20 volt D.C. biasing voltage applied across terminals 72, 74. The biasing circuit has a current rating of generally 5–20 milliamps. When a Hall Effect switch is subjected to a flux field having an intensity above a threshold point, known as the "operate point" the output 70 is toggled. This happens substantially instantaneous and requires only a few nanoseconds. In many instances, a Hall Effect switch has an input voltage regulating stage. In practice, ULS 3006 T Hall Effect digital switch unit is used. This switch is distributed by Sprague Electric Company of Concord, N.H. and includes an input voltage regulator to maintain the D.C. biasing voltage substantially fixed to give a set flux operate point. When the Hall Effect switch is regulated internally, as done in the preferred embodiment of the invention, voltage across terminals 73, 74 is a supply voltage which may vary somewhat. However, in practice the input voltage is regulated at a voltage, such as 9 volts D.C. to guarantee a fixed operate point, or at least sufficient supply voltage. The flux operate point to toggle switch HE is determined by the internal or external D.C. biasing voltage.

Figure 4:
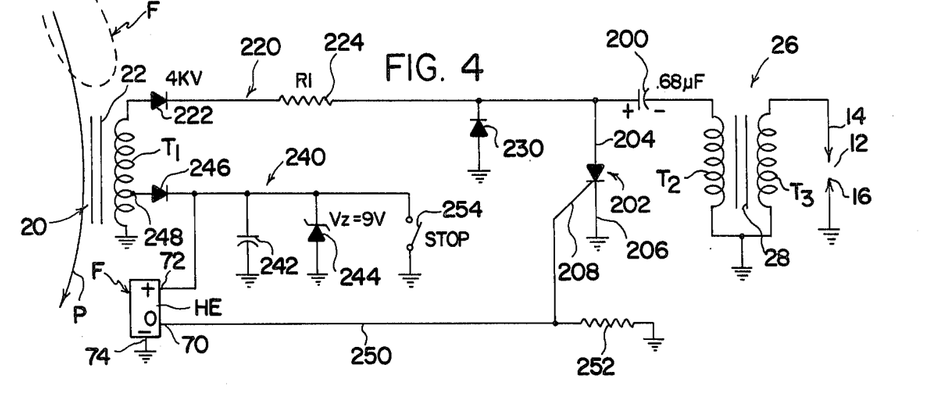
FIGS. 4–6 are wiring diagrams illustrating circuits employed in accordance with the present invention.
Figure 5:
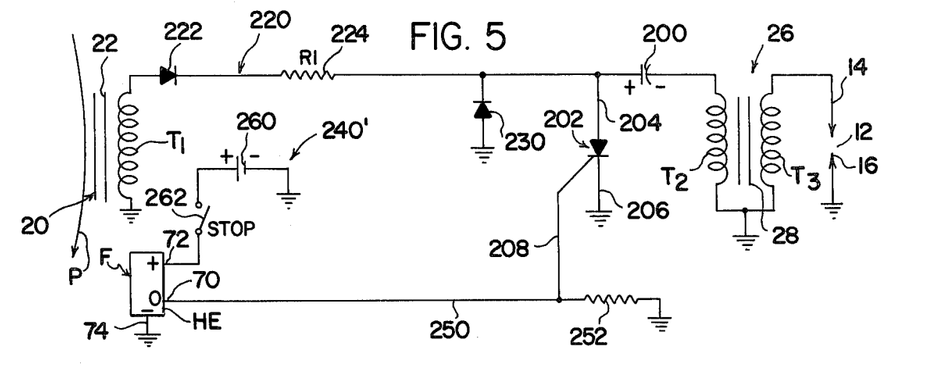
Figure 6:
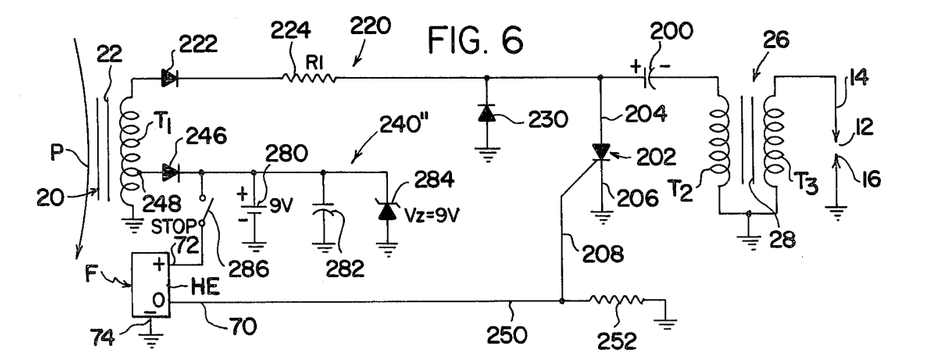

Referring now to FIGS. 4-6, several wiring diagrams are illustrated for use in the preferred embodiment of the invention as illustrated in FIGS. 1 and 2. The preferred wiring diagram is shown in FIG. 4 wherein a storage device 200, a capacitor in this instance, is in series with primary winding T2 of ignition coil 26. In this series circuit there is also provided a switching means 202 in the form of an SCR having a cathode 206, an anode 204 and a gate 208. The SCR has sufficient reverse voltage characteristics to withstand any reverse voltage experienced by the ignition circuit. Diode 230 also protects the SCR in the circuit illustrated in FIG. 4. To charge capacitor 200 there is provided a charging circuit 220 including a rectifying diode 222 and a charging resistor 224 having a value for charging capacitor 200 to a sufficient voltage for periodic firing through SCR 202 at various speeds of the internal combustion engine. The SCR is fired, in accordance with the invention, by Hall Effect switch HE. The Hall Effect switch, as previously mentioned, includes output 70 and biasing or voltage supply terminals 72, 74. As is well known, output 70 toggles when switch HE is exposed to a magnetic flux field exceeding a certain flux intensity. The intensity required to toggle output 70 is determined by the D.C. biasing voltage applied across terminals 72, 74 or regulated internally of the integrated circuit switch. Generally the biasing voltage is a fixed voltage in the general range of 5-20 volts D.C. In practice, the biasing voltage is 9 volts regulated internally of switch HE. However, an external regulated voltage of 9 volts is used to supply power to terminals 72, 74. This regulated supply can be used with either a regulated or linear, i.e., non-regulated, Hall Effect switch. In FIG. 4, flux field F created by the magnet having poles 50a, 50b has sufficient intensity to actuate switch HE as flywheel 50 rotates the flux field into proximity with the Hall Effect switch. A biasing circuit 240 for maintaining the D.C. biasing or supply voltage across terminals 72, 74 includes a storage capacitor 242 and a Zener diode 244 having a break down voltage, which in practice is 9 volts. Rectifying diode 246 is connected with winding $T_1$ at a tap 248. Thus, voltage induced into winding $T_1$ is rectified by diode 246 and charges capacitor 242 which is maintained at 9 volts, or any other selected volts, by Zener diode 244. Consequently, D.C. voltage for Hall Effect switch HE is constant at a selected value determined by circuit 240. To prevent a spark by the circuit illustrated in FIG. 4, there is provided a stop switch 254 which grounds terminal 72. At ground potential, switch HE can not be toggled by a flux field of the intensity of field F. Thus, no output signal can be created at terminal 70 by a flux field F passing across switch HE. When flux field F intersects switch HE, an appropriate signal is created at terminal 70 to energize line 250 to produce a gating signal in line 208. Resistor 252 is a leakage resistor for gate 208 and terminal 70.

In operation, as flux field F passes by shoes 24 of core 22, induced voltage is created in charging circuit 220 for charging capacitor 200 to a level sufficient to cause a sparking voltage upon discharge through SCR 202. Consequently, electrical energy is stored in capacitor 200. At the same time, coil means $T_1$ maintains capacitor 242 charged to the desired 9 volt D.C. biasing or supply voltage level. Of course, in use, capacitor 200 is repeatedly charged and discharged by the SCR to produce repeated sparks at plug 12. When flywheel 50 reaches a selected angular position, the flux field F triggers switch HE. This gates SCR and discharges the stored electrical energy of capacitor 200 through primary winding $T_2$. This rapid increase of current in primary $T_2$ causes a high induced voltage in the secondary winding $T_3$. Thus, a sparking voltage is created across electrode 16 of spark plug 12. Resistor 224 has a value to allow sufficient charging of capacitor 200 between periodic discharges by the action of Hall Effect switch HE. To stop creation of sparks, switch 254 is closed. This removes the D.C. voltage across terminals 72, 74 so that there is no additional gating signals from output 70 to SCR 202. SCR 202 is commutated by the current oscillations in the series circuit including winding $T_2$.

Referring now to FIG. 5, a modification of the circuit illustrated in FIG. 4 is presented. In this modification, the biasing or supply circuit 240' for Hall Effect switch HE includes a battery 260. Consequently, the biasing voltage is not applied by induced voltage in winding $T_1$. A stop switch 262 is opened to remove the D.C. voltage from switch HE. During normal operation, switch 262 is closed. Other components of the wiring diagram shown in FIG. 5 correspond to the same components used in the wiring diagram of FIG. 4.

Referring now to FIG. 6, a further modified D.C. biasing circuit 240" is provided. In this circuit, battery 280 provides a D.C. voltage in a manner similar to biasing circuit 240'. In this modified circuit, battery 280 is connected in series with a stop switch 286. Combined with this biasing circuit is a further circuit similar to biasing circuit 240. A capacitor 280 and a Zener diode 284 are connected in parallel to receive energy from rectifying diode 246. By using this combined structure, the battery 280 assures a constant 9 volt D.C. biasing voltage across terminals 72, 74 for fixed operation of switch HE irrespective of slight variations in the voltage received from coil means $T_1$. This constant voltage can provide the fixed D.C. biasing or supply voltage for an internal regulated voltage of switch HE. Of course, other arrangements could be used for discharging electrical energy stored in a storage device by the operation of a Hall Effect switch means. For instance, it is possible to use an inductive storage device instead of a capacitive storage device as shown.

Figure 7:
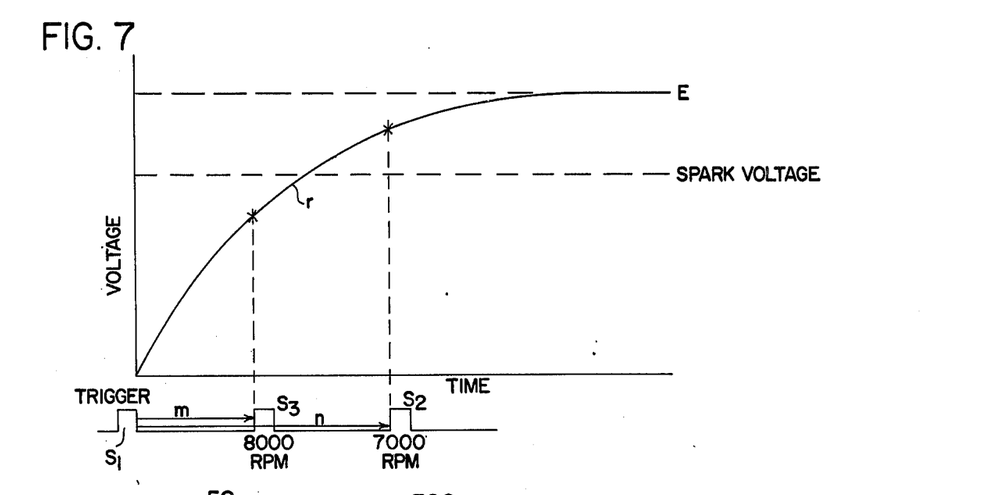
FIG. 7 is a time constant charging graph for the energy storing device used in the preferred embodiment of the present invention and a firing graph.
Figure 8:
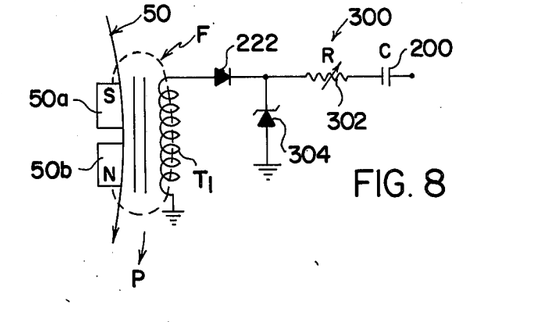
FIG. 8 is a partial view illustrating a further aspect of the present invention; and, FIG. 9 is a graph similar to FIG. 7 illustrating variations in the charging rate of the energy storing device in accordance with one aspect of the invention.

In accordance with another aspect of the present invention, there is provided an adjustable over speed circuit having no moving parts and requiring no modification of the carburetor for limiting the maximum speed of the internal combustion engine controlled by the ignition system. This concept is schematically illustrated in FIG. 8 wherein a charging circuit 300 is used for charging capacitor 200. This charging circuit includes a variable resistor or rheostat 302. As shown in FIG. 7, capacitor 200 is charged along a standard time constant curve r toward a selected voltage E, which is greater than the D.C. voltage required for sufficient energy to create a spark upon discharge of the capacitor 200. In the lower portion of FIG. 7, a first trigger $S_1$ discharges capacitor 200. Shortly thereafter, the capacitor starts to recharge along curve r. At a certain speed illustrated as 7000 rpm, the next adjacent firing trigger $S_2$ is created at a time spaced from the first trigger $S_1$ by time n. At the time of trigger $S_2$ Hall Effect switch HE discharges capacitor 200. Since the capacitor is at a charged level greater than the sparking voltage, a spark is created at the spark plug. As the speed of the engine increases, fly-wheel 50 has an increased velocity so that eventually the next adjacent trigger pulse after a pulse $S_1$ will be in the time relationship position indicated by trigger $S_3$. This new trigger has a time spacing m from trigger $S_1$. As shown in FIG. 7, discharge of capacitor 200 at this position will not cause a spark in the internal combustion engine. There is not sufficient energy stored within capacitor 200, since the capacitor is below the spark voltage. Consequently, by selecting the proper value of resistor 302, a speed limiting feature for the engine is accomplished. Above a certain rotational speed of flywheel 50, no spark will be created. As the speed is decreased, a spark will be created and normal operation will occur. No complicated moving parts are required and the carburetor is not affected by this type of speed limiting feature.

Figure 9:
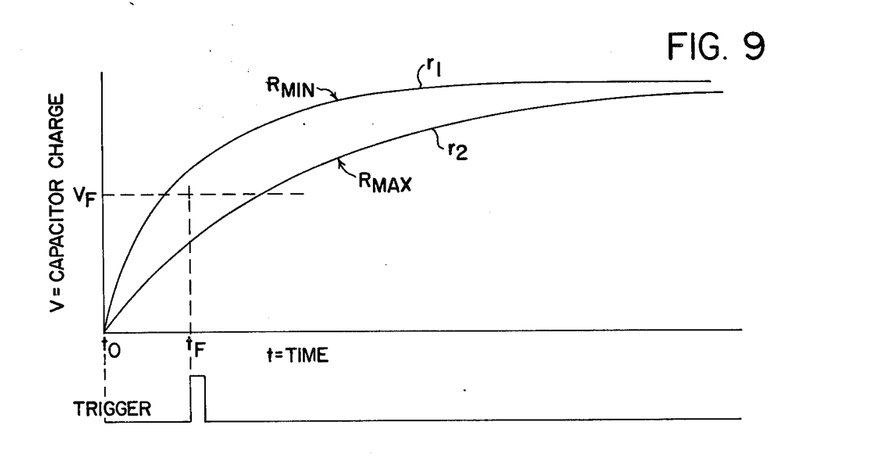

In accordance with the preferred embodiment of the invention, resistor 302 is variable. Thus, the charging circuit can be varied between curves $r_1$ and $r_2$, as shown in FIG. 9. Thus, the maximum speed is controlled by adjusting resistor 302. In FIG. 9, the firing time after capacitor 200 is being charged is identified as $t_F$. The sparking voltage level is indicated by the horizontal line $V_F$. At time $t_F$ a spark would not be created if resistor 302 were set to its maximum level and capacitor 200 is charged along line $r_2$. However, if resistor 302 were set to its minimum level, capacitor 200 is charged along line $r_1$ and sufficient voltage and energy would be available at time $t_F$. In view of the showings in FIGS. 7 and 9, it is apparent that adjustment of resistor or rheostat 302 can change the maximum rotational speed of the internal combustion engine. As shown in FIG. 8, Zener diode 304 may be provided so that the value of the charging voltage E is maintained constant. This is optional and is used as a control feature.

Having thus described the invention, it is claimed:

1. In an ignition system including a member rotatable about an axis, a single permanent magnet having an outwardly extending flux field and carried by said member to create a flux field rotating in a given annular path concentric with said axis, a circuit for creating a sparking voltage upon a rapid change in current in at least a portion of said circuit, and switching means for causing said rapid change in current upon actuation thereof, the improvement comprising: capacitor means in said circuit for storing sparking energy, said switch means including a solid state device for discharging said capacitor and means for actuating said device upon receipt of a firing signal, coil means in said path for charging said capacitor to a voltage level above a sparking voltage by the voltage induced into said coil means by said rotating flux field, a Hall Effect switch activated by a selected D.C. biasing voltage and having a switchable output with a first condition directing said firing signal to said solid state device when said Hall Effect switch is subjected to a flux field of a given magnitude and means for mounting said Hall Effect switch in a selected location in said path for switching said output to said first condition when said rotatable member is at a given angular position and said magnet is adjacent said Hall Effect switch.

2. The improvement as defined in claim 1 including a biasing circuit for creating a generally fixed D.C. biasing voltage and means for directing said D.C. voltage to said Hall Effect switch.

3. The improvement as defined in claim 2 wherein said biasing circuit includes a winding and means for mounting said winding in said path and exposed to said rotating field and means for rectifying the alternating current induced into said winding.

4. The improvement as defined in claim 3 wherein said biasing circuit includes a capacitor and voltage limiting device in parallel.

5. The improvement as defined in claim 4 including a battery having said selected D.C. voltage.

6. The improvement as defined in claim 2 wherein said biasing circuit includes a capacitor and voltage limiting device in parallel.

7. The improvement as defined in claim 6 including a battery having said selected D.C. voltage.

8. The improvement as defined in claim 2 including means for manually removing said D.C. biasing voltage from said Hall Effect switch.

9. The improvement as defined in claim 1 including a manually actuated switch means having a first position for applying said D.C. biasing voltage to said Hall Effect switch and a second position for removing said biasing voltage from said Hal Effect switch.

10. The improvement as defined in claim 3 including a coil having a first portion forming said coil means and a second portion forming said winding.

11. The improvement as defined in claim 1 including means for changing the angular speed of said rotatable member over a given range and mechanical means for changing said selected location of said Hall Effect switch in said path in accordance with said speed change for at least a portion of said speed range.

12. The improvement as defined in claim 11 wherein said range extends from a lower speed to a higher speed and said portion is spaced from said lower speed a given amount.

13. The improvement as defined in claim 11 including means for limiting movement of said Hall Effect switch by said mechanical means.

14. The improvement as defined in claim 1 including means for adjusting the rate at which said capacitor is charged.

15. The improvement as defined in claim 14 wherein said adjusting means includes a variable resistor between said coil means and said capacitor.

16. The improvement as defined in claim 1 wherein at a given rotational speed of said member said rotating flux field switches said Hall Effect switch at a rate having a selected time spacing between said actuations and means for limiting the charging of said capacitor to a selected charging rate requiring a time greater than said selected time to obtain said voltage level.

17. The improvement as defined in claim 16 including means for varying said selected charging rate.

18. The improvement as defined in claim 17 wherein said varying means is a variable resistor between said coil means and said capacitor.

19. The improvement as defined in claim 1 wherein said rotatable member is rotated by the crankshaft of an internal combustion engine.

20. The improvement as defined in claim 1 including mechanical means for selectively changing said selected location of said Hall Effect switch in said path.

21. The improvement as defined in claim 20 including means for changing the rotational speed of said rotatable member and means controlled by said speed changing means for operating said mechanical means.

22. In an ignition system including a member rotatable about an axis, a single permanent magnet having an outwardly extending flux field and carried by said member to create a flux field rotating in a given annular path concentric with said axis, a circuit for creating a sparking voltage upon a rapid change in current in at least a portion of said circuit, and switching means for causing said rapid change in current upon actuation thereof, the improvement comprising: said switching means including a solid state device and means for actuating said device upon receipt of a firing signal, a Hall Effect switch activated by a selected D.C. biasing voltage and having a switchable output with a first condition directing said firing signal to said solid state device, means for mounting said Hall Effect switch in a selected location in said path for switching said output to said first condition when said rotatable member is at a given angular position, mechanical means for selectively changing said selected location of said Hall Effect switch in said path, means for changing the rotational speed of said rotatable member and means controlled by said speed changing means for operating said mechanical means.

23. In an ignition system including a member rotatable about an axis, a single permanent magnet having an outwardly extending flux field and carried by said member to create a flux field rotating in a given annular path concentric with said axis, a circuit for creating a sparking voltage upon a rapid change in current in at least a portion of said circuit, said circuit including a capacitor for storing electrical energy at a selected rate and switching means for causing said rapid change in current by discharging said capacitor upon actuation of said switching means, the improvement comprising: said switching means including a solid state device and means for actuating said device upon receipt of a firing signal, a Hall Effect switch activated by a selected D.C. biasing voltage and having a switchable output with a first condition directing said firing signal to said solid state device, means for mounting said Hall Effect switch in a selected location in said path for switching said output to said first condition when said rotatable member is at a given angular position, and means for limiting said selected charging rate to a preselected charging rate to inhibit said sparking voltage above a selected angular speed of said rotatable member.

24. The improvement as defined in claim 23 including means for changing said preselected charging rate.

25. The improvement as defined in claim 24 wherein said rate changing means is a variable resistor in said charging circuit.

26. In an ignition system including a member rotatable about an axis, a single permanent magnet having an outwardly extending flux field and carried by said member to create a flux field rotating in a given annular path concentric with said axis, a circuit for creating a sparking voltage in a first winding upon a rapid change in current in at least a portion of said circuit, and switching means for causing said rapid change in current upon actuation thereof, the improvement comprising: an electrical energy storing means in said circuit for storing electrical energy, coil means for directing electrical energy to said storing means, means for mounting said coil means in said path to receive induced energy upon exposure to said moving magnetic field, a Hall Effect switch means for periodically discharging upon actuation said stored energy through a second winding magnetically coupled to said first winding at a time spacing determined by the velocity of said member, a biasing circuit for directing a D.C. biasing voltage of a selected level to said Hall Effect switch, and means for locating said Hall Effect switch at a selected position in said path.

27. The improvement as defined in claim 26 including circuit means for storing energy in said storing means at a selected rate, said selected rate being sufficient to store electrical energy to a given sparking level when said time spacing is above a selected amount.

28. The improvement as defined in claim 27 including means for varying said selected rate.

29. The improvement as defined in claim 26 including means for changing the angular speed of said rotatable member over a given range and mechanical means for changing said selected location of said Hall Effect switch in said path in accordance with said speed change for at least a portion of said speed range.

30. The improvement as defined in claim 29 wherein said range extends from a lower speed to a higher speed and said portion is displaced from said lower speed a given amount.

31. The improvement as defined in claim 29 including means for limiting movement of said Hall Effect switch by said mechanical means.

32. The improvement as defined in claim 26 wherein said biasing circuit includes a battery having a D.C. voltage output equal to said selected level.

33. The improvement as defined in claim 26 wherein said energy storing means is a capacitor.

34. The improvement as defined in claim 33 including circuit means for storing energy in said storing means at a selected rate, said selected rate being sufficient to store electrical energy to a given sparking level when said time spacing is above a selected amount.

35. The improvement as defined in claim 34 including means for varying said selected rate.

36. In an ignition system including a member rotatable about an axis, a single permanent magnet having an outwardly extending flux field and carried by said member to create a flux field rotating in a given annular path concentric with said axis, a circuit for creating a sparking voltage in a first winding upon a rapid change in current in at least a portion of said circuit, said circuit including a capacitor and means for charging said capacitor by said flux field and switching means for causing said rapid change in current by discharging said capacitor, the improvement comprising: said switch means being a Hall Effect switch means for periodically discharging said capacitor upon being exposed to said flux field with the time spacing between said charging and discharging of said capacitor being determined by the velocity of said member, a biasing circuit for directing a D.C. biasing voltage of a selected level to said Hall Effect switch, and means for locating said Hall Effect switch at a selected position in said path for controlling said time spacing.

37. The improvement as defined in claim 36 wherein charging means include a coil means for directing electrical energy to said capacitor and means for mounting said coil means in said path to receive induced energy upon exposure to said moving magnetic field.

38. The improvement as defined in claim 37 including circuit means for storing energy in said capacitor at a selected rate, said selected rate being sufficient to store electrical energy in said capacitor to a given sparking voltage level when said time spacing is above a selected amount.

* * * * *